May 7, 1963 J. M. HOVEY 3,089,040

DIVIDER CIRCUIT USING DELAY TIME TO INHIBIT TRANSISTOR CONDUCTION FOR PREDETERMINED MULTIPLE OF INPUT PULSES

Filed Nov. 30, 1960

INVENTOR
JOHN M. HOVEY

BY John E. Kidd AGENT

Richard C. Reed ATTORNEY

United States Patent Office
3,089,040
Patented May 7, 1963

3,089,040

DIVIDER CIRCUIT USING DELAY TIME TO INHIBIT TRANSISTOR CONDUCTION FOR PREDETERMINED MULTIPLE OF INPUT PULSES

John M. Hovey, 6533 Abbington Drive SE., Oxon Hill, Md.

Filed Nov. 30, 1960, Ser. No. 72,819
6 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

This invention relates to an improvement in the methods and circuits for generating repetitive patterns of pulsed electrical energy and more particularly to a silicon transistor counter circuit.

There has long been a need for an efficient and compact counting circuit for use in airborne equipment. Vacuum tube circuits have been regularly employed; however, due to their extreme bulkiness, the excessive amount of power required and large number of active elements, their usefulness as a counting or repetitive pulsing circuit becomes highly confined. The advent of the transistor furnished a more feasible means for obtaining a circuit for providing a repetitive pulse pattern, such as the flip-flop or a capacitive triggered pulse counting circuit. However, in either circuit there exists a large number of active elements; a great deal of power is still required and the circuits still remain comparatively bulky. Furthermore, in capacitive triggering counters the leakage of charge from the capacitor makes this type of counter unsuitable in application where the counter must remain in a quiescent state for long periods of time between application of pulses.

The general purpose of this invention is to provide a counting circuit which embraces all the advantages of similarly employed counting circuits and possesses none of the aforedescribed disadvantages. The present invention contemplates a unique silicon transistor repetitive pulse generating circuit whereby extremely good reliability, frequency response and circuit standardization with a minimum of elements is made possible.

Checking radar, loran and other system range calibration, measuring resolution of fast circuits, and measuring or simulating fast gates are typical of situations where such a circuit is applicable.

It is an object of this invention therefore to provide a reliable repetitive pulse generating circuit which is of simple and inexpensive design, yet extremely stable and accurate in operation.

It is an object of this invention to provide a frequency divider that will operate over a broad range of supply voltage variation.

Yet another object is to provide a pulse counting circuit for measuring and establishing an accurate repetitive pulse in the microsecond region while having very low power consumption and capable of operating over a wide temperature range.

It is also an object to provide a frequency divider wherein the circuit, upon obtaining a basic frequency of division, will divide any signal applied to its input according to the same basic frequency.

Still another object is to provide a highly efficient countdown circuit that will operate at very high speeds and capable of use for dividing clock frequencies, generating a pulse pattern and as a pulse width limiter.

Other objects and advantages of the invention will hereinafter become more fully apparent from the following description of the annexed drawings which illustrate a preferred embodiment, and wherein.

Figure 1:
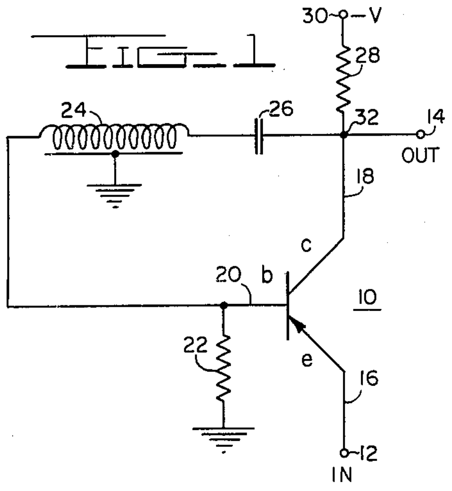
FIG. 1 shows a schematic circuit diagram of one embodiment of a silicon countdown circuit in accordance with the principles of my invention.
Figure 2:
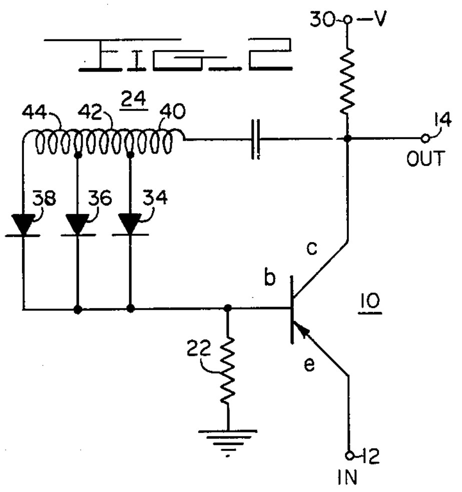
FIG. 2 shows a modification of this circuit wherein a 3:1 countdown is possible.
Figure 3:
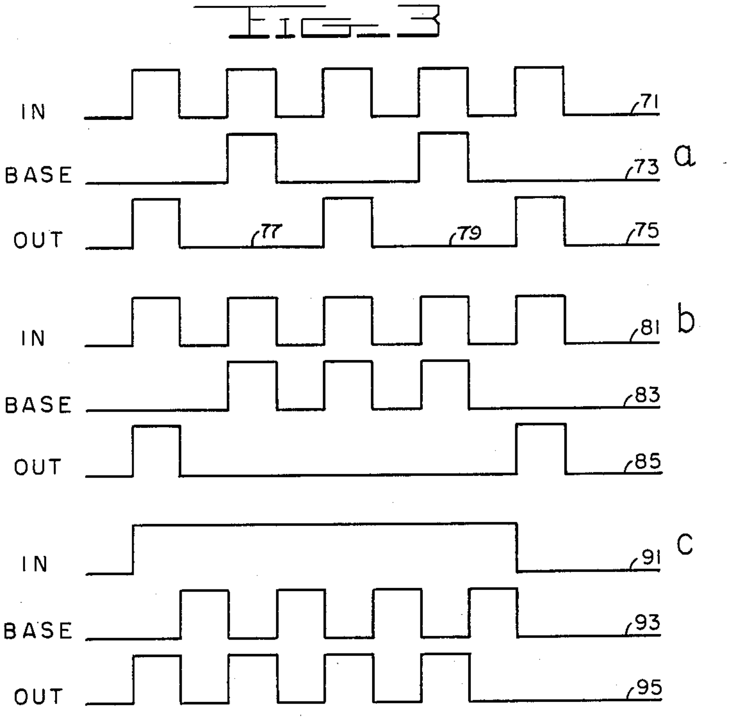

FIGS. 3*a*, *b* and *c* show different waveform sequences useful in explaining the circuits shown in FIG. 1 and FIG. 2.

The invention provides a silicon transistor having a delay line connected between the collector and base electrodes. The principle involved here is that a positive signal that has a long time period with respect to a delay line is impressed upon an emitter, causing the collector to swing positive from its initial state. The positive transient then traverses the delay line, which is delayed in time from the initial input by a length of time approximately equal to the electrical length of the delay line. This delayed transient is then applied to the base of the transistor, turning the transistor off, for the period the transient must traverse the delay line. Any positive input signal is thereby inhibited for the same period.

Referring now to the drawings, wherein like reference characters designate like or corresponding parts throughout the several views, FIG. 1 shows a counter circuit capable of a 2:1 countdown. In FIG. 1, input pulses of a given repetition frequency to be counted or divided are impressed upon input terminal 12 and after processing appear at output terminal 14. A silicon semiconductor, transistor 10, having emitter electrode 16, collector electrode 18 and base electrode 20 is connected between terminals 12 and 14. It is to be appreciated that while a p-n-p type semiconductor is shown, it may be replaced by its complementary type semiconductor, provided that in normal operation the polarities of all the voltages and currents are reversed. The collector electrode 18 is biased negatively with respect to the potential applied at terminal 12, by a negative potential supply source 30. The collector is biased by means of resistor 28 and negative supply source 30 so as to render the transistor 10 conducting when an appropriate signal is applied to its input or emitter junction. Capacitor 26 and delay line 24 provide a feed back circuit between point 32 and base electrode 20 wherein any signal developed at the output terminal 14 is also fed to the base of transistor 10. Delay line 24 acts as a low pass filter, having generally a 1K ohm impedance and one side connected to ground. A current limiting resistor 22 having a value equal to the surge or characteristic impedance of the delay line 24 is connected between the base electrode 20 and ground potential. Capacitor 26 serves the purpose of isolating resistance 22 from the potential that exists at point 32.

The operation of FIG. 1 may be better understood by reference to the waveform sequence shown in FIG. 3*a*. Let it be assumed, for example, that transistor 10 is properly biased so as to be in the non-conducting state and that an input signal such as cyclic pulse train 71 is introduced at input terminal 12 and applied to the emitter electrode 16 of transistor 10. The input pulse changes the height of the barrier at the emitter electrode causing current to flow in the emitter-base circuit. The diffusion of holes causes the transistor 10 to switch to the conducting state and a resultant waveform 75 appears at point 32 and output terminal 14. Thereinafter the waveform travels down the delay line 24, which has a selected time delay equal to the cycle of the first pulse in the pulse train 71. This waveform 73 will next appear at the base electrode 20, in phase with the next cycle of the input train 71 and will bias the base current off, inhibiting the flow of holes and preventing conduction. Thereby, the second cycle of the pulse train 71 is suppressed as shown at point 77 of pulse train 75. The third cycle of pulse train 71 will again lower the junction barrier, causing transistor 10 to conduct and which, when delayed, will inhibit the fourth cycle of pulse train 71, as shown at point 79. Hence every other cycle is suppressed and a 2:1 countdown has occurred.

By varying the delay characteristics of time delay 24 or the repetitive frequency of the cyclic pulse train, a countdown can be provided which is selectively capable of counting on any practical predetermined scale. Such a circuit is shown in FIG. 2, with its corresponding waveform sequence shown in FIG. 3*b*. Here a delay line 24 is equal to three cycles of the input pulse train 81. To provide for proper feed back to the base electrode, the delay line must be tapped at points equal to one and two cycles of the input signals applied to emitter 16. Such tapping points are provided on delay line 24 by unilateral impedance elements 34 and 36 to deliver impulses representative of a one-cycle delay and a two-cycle delay, respectively, to the base electrode. Since the delay line is equivalent to three cycles of the input signal, pulse train 83 will be applied to the base electrode, in proper phase so as to inhibit the transistor 10 and suppress the next three succeeding input pulse cycles of pulse train 81. Hence every fourth pulse applied to terminal 12 will cause transistor 10 to conduct and the others will be suppressed as shown by pulse train 85. It should be appreciated that the structure of the feed back circuit could be designed to be more selectable by inserting switching apparatus between diodes 34, 36 and 38 and the resistor 22. Also it may be found necessary in some applications to insert an emitter follower circuit between the diodes 34, 36 and 38 and resistor 22 for more stable operation or to compensate for delay line limited in its characteristics.

Transistors will tend to undergo sustained or erratic oscillations when rapid current reversals occur at one of the transistor electrodes, hence diodes 34, 36 and 38 are also provided to prevent such occurrences by further isolating the base from the collector.

The simplicity and versatility of this repetitive pulse generating circuit may be further appreciated by considering the waveform sequence shown in FIG. 3*c*. Here a pedestal pulse such as 91 is applied to input terminal 12 of the circuit similar to FIG. 1. An output pulse immediately appears at point 32 and output terminal 14, while at the same time being suitably delayed for a half portion of the input signal thereby inhibiting the input signal for a half cycle as indicated by pulse train 93. The cycle is repeated as long as a positive signal is applied to the emitter electrode thereby producing a pulse train such as 95 at output terminal 14. If the input to the emitter is periodic and of a period that is some simple fraction of the delay line length, then the transistor will pass a number of the periodic waveforms equal to the number of cycles that delay line 24 can attentuate and then a succeeding equal number of cycles will be suppressed. This process will repeat itself as long as the periodic waveforms are impressed at 12. If a single pulse not greater than twice the width of the delay line is impressed on the emitter electrode, this circuit will serve as a pulse width limiter. If the input pulse width is less than the electrical length of the line, it will appear unaltered at the collector. If the input pulse width is between 1 and 2 times the electrical length of the line the output pulse will be equal to the electrical length of the delay line.

A unique feature is that while the circuit shown in FIG. 1 has a basic frequency represented by the leading edge of waveform 75; if the repetitive input signal is doubled, the delay line 24 becomes the equivalent of two cycles of the input signal but the leading edge of the output waves will still be generated at the basic frequency of waveform 75.

It should also be appreciated that several of these countdown circuits such as shown in FIG. 1, having different delay line characteristics, could be connected to an equal number of bus bars and by properly connecting diode output leads to the bus bar, a stepping counter or various and/or logic circuits are possible.

While the salient features of the present invention have been described in detail with respect to one embodiment, it will be readily apparent that numerous modifications may be made within the spirit and scope of the invention as set forth in the appended claims.

What is claimed is:

1. In a countdown circuit responsive to a number of input pulses comprising a transistor, having at least a collector, base and emitter junctions, a periodic recurring input pulse signal of positive potential with respect to ground, means connecting said signal directly across the base and emitter junctions, means for applying a potential to said collector junction, said potential being negative with respect to said input signal, a delay line means having a time delay equal to a multiple of the period of said input pulse, said delay line means connected between said collector and base junction so that certain of the periodic input pulses may be inhibited by biasing the transistor into a nonconductive state, impedance means connecting the base junction to ground, means to isolate the impedance means from the negative potential means, output means connected to said isolating means and said collector junction, a periodic output signal produced at said output means having pulses of a width equal to said input pulses.

2. A counter circuit as set forth in claim 1 wherein said isolating means is a capacitor, said impedance means has the same impedance characteristics of the delay line.

3. A counter circuit as set forth in claim 2, including a tapping means, said tapping means connected between said delay line and said base, each of said tapping means containing a diode.

4. In a countdown circuit comprising a transistor having at least a collector, base and emitter junctions, a periodic recurring pulse input signal source, means applying said pulse input across the base and emitter junction, a delay line means having a time delay equal to a multiple of the period of said input pulse, means connecting the delay line between said collector and said base junction for completely inhibiting certain input pulses thereby rendering the transistor inoperative, an output pulse train produced at said collector having a period equal to at least twice the input period, means to apply a potential to said collector junction, said potential being negative with respect to the potential of said emitter junction output means connected directly to said collector junction, and an isolating capacitor connected between said collector junction and said delay line.

5. A countdown circuit comprising a transistor having at least a collector, base and emitter junctions, a periodic recurring pulse input signal source, means applying said pulse input across the base and emitter junction, a delay line means having a time delay equal to a multiple of the period of said input pulse, means connecting the delay line between said collector and said base junction for completely inhibiting certain input pulses thereby rendering the transistor inoperative, an output pulse train produced at said collector having a period equal to at least twice the input period, means to apply potential to said collector junction, said potential being negative with respect to the potential of said emitter junction, and a resistance of the same impedance characteristics of the delay line is connected between the base junction and ground potential.

6. In a countdown circuit comprising a transistor having at least a collector, base and emitter junctions, a periodic recurring pulse input signal source, means applying said pulse input across the base and emitter junction, a delay line means having a time delay at least equal to twice the multiple of the period of said input pulse, said delay line means being tapped at points where the time delay is equal to multiples of the period of said input pulse, the tappings are connected to the base, thereby allowing wider control of an input signal, means connecting said delay line between said collector and said base junction for completely inhibiting certain input pulses thereby rendering the transistor inoperative, an output pulse train produced at said collector having a period equal to at least twice the input period, means to apply a potential to said collector junction, said potential being negative with respect to the potential of said emitter junction and output means connected directly to said collector junction.

References Cited in the file of this patent

UNITED STATES PATENTS

| | | |
|---|---|---|
| 2,447,082 | Miller | Aug. 17, 1948 |
| 2,589,254 | Hoeppner | Mar. 18, 1952 |
| 2,888,557 | Schneider | May 26, 1959 |
| 2,941,091 | Schneider | June 14, 1960 |

OTHER REFERENCES

Waveforms by Chance et al., Radiation Laboratory Series, vol. 19, first edition 1949, McGraw-Hill Book Co.